United States Patent
Itoh et al.

(10) Patent No.: US 6,493,189 B1
(45) Date of Patent: Dec. 10, 2002

(54) APPARATUS AND METHOD FOR CONFIGURING AND ELECTRICALLY INTERCONNECTING THE ELEMENTS OF A HEAD GIMBAL ASSEMBLY IN A DISK DRIVE

(75) Inventors: Kenji Itoh; Yasuhiro Mita, both of Fujisawa; Masaaki Nanba, Yamato; Tatsushi Yoshida, Chigasaki, all of (JP)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/560,325

(22) Filed: Apr. 28, 2000

(30) Foreign Application Priority Data

Apr. 30, 1999 (JP) ............................................. 11-123288

(51) Int. Cl.[7] ................................................. G11B 5/48
(52) U.S. Cl. .............................. 360/245.8; 360/234.5; 29/603.06
(58) Field of Search ......................... 360/234.5, 266.3, 360/245.8, 246; 29/603.06

(56) References Cited

U.S. PATENT DOCUMENTS

| | | | | |
|---|---|---|---|---|
| 5,742,996 A | * | 4/1998 | Frater et al. | 29/603.06 |
| 5,754,370 A | * | 5/1998 | Tsuchiya et al. | 360/245.8 |
| 5,815,349 A | * | 9/1998 | Frater | 360/245.8 |
| 5,832,764 A | * | 11/1998 | Girard | 72/16.3 |
| 5,875,072 A | * | 2/1999 | Brooks, Jr. et al. | 360/245.8 |
| 5,930,078 A | * | 7/1999 | Albrecht et al. | 360/245.8 |

* cited by examiner

*Primary Examiner*—Jefferson Evans
(74) *Attorney, Agent, or Firm*—Robert B. Martin; Bracewell & Patterson, L.L.P.

(57) ABSTRACT

A head gimbal assembly is provided with a slider that flies above the surface of a disk, and a head for reading/writing data from/onto the surface of the disk. One or more conductive wires are connected to the head and are used to transmit data. A load beam supports the wire(s) thereon and holds the head/slider near a front end of the load beam. Each wire forms a wire loop between the head connecting point edge and the wire fixing point. A predetermined portion of each wire loop is pressed from above on the surface of the load beam, and then pushed toward the head connecting point edge, thereby plastically deforming a section between the head connecting point edge and the predetermined portion of the wire loop.

4 Claims, 19 Drawing Sheets

*Embodiment*

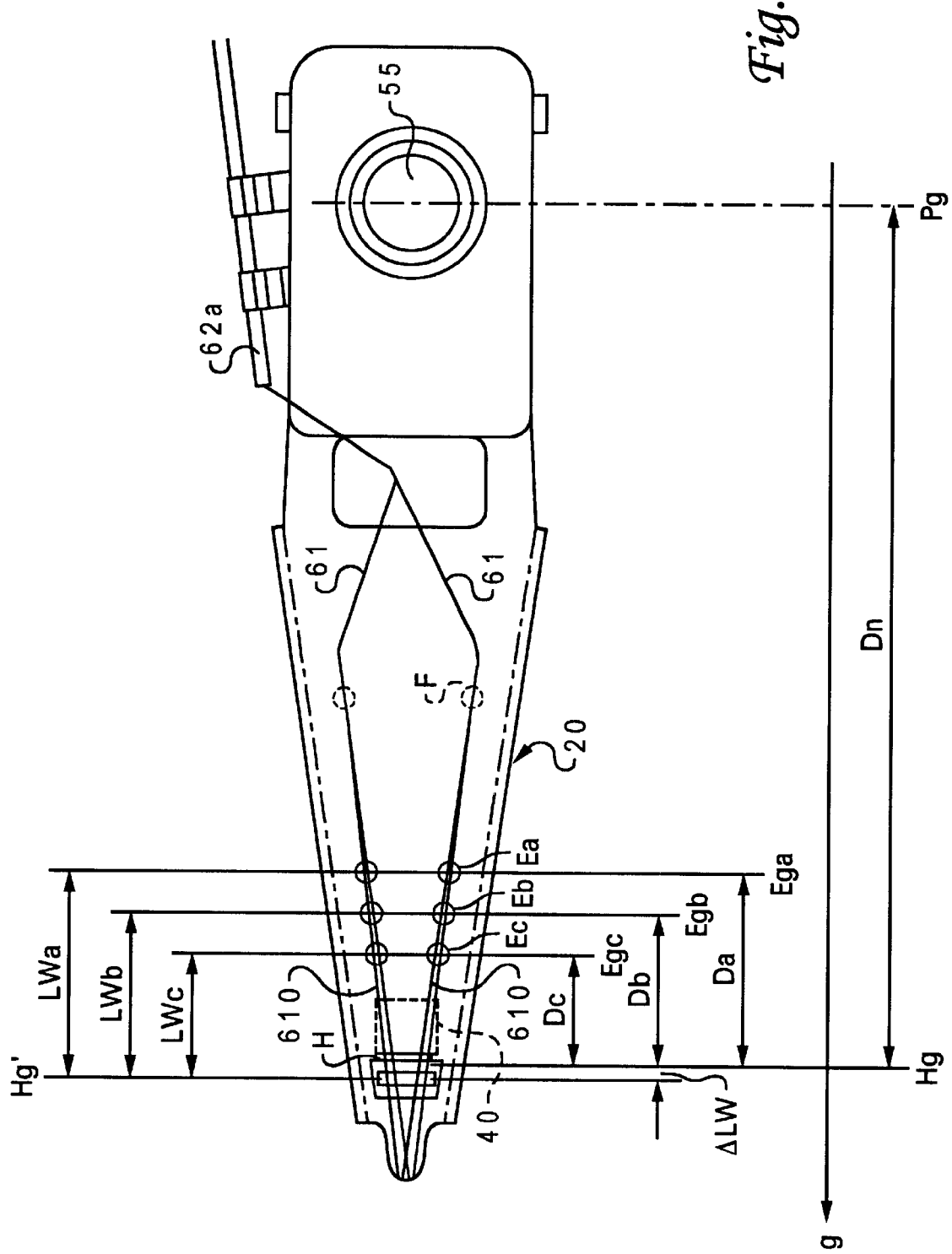

APPARATUS AND METHOD FOR CONFIGURING AND ELECTRICALLY INTERCONNECTING THE ELEMENTS OF A HEAD GIMBAL ASSEMBLY IN A DISK DRIVE

We hereby claim foreign priority benefits under Title 35, United States Code, §119, of the following foreign application for patent: Japanese Patent Application No. 123288, filed Apr. 30, 1999.

BACKGROUND OF THE INVENTION

1. Technical Field

The present invention relates to a disk apparatus provided with a rotatable disk, which is a data recording medium, a head/slider that flies above the surface of the disk to read/write data therefrom/thereon in without making contact therewith, a head gimbal assembly (HGA) provided with a load beam on which wires for transmitting data are laid, and an actuator for holding the HGA and moving it in the radial direction of the disk. More particularly, the invention relates to a method for improving the HGA structure for laying wires, a wire forming method, and a wire forming apparatus.

2. Description of the Related Art

In a data recording medium such as a disk apparatus, a disk is rotated by a spindle motor and a head/slider is supported by an HGA. The head/slider is obtained by embedding a head (e.g., an MR head) for reading/writing data from/onto the surface of the disk. The slider flies above the rotating disk with the aid of an air bearing surface. The HGA, provided for each disk surface, is held by the actuator that rotates with respect to the frame of the disk apparatus and moved in the radial direction of the disk.

The HGA is provided with a load beam supported by the actuator at its rear end, a flexure attached close to front end of the load beam, a head/slider held at the flexure, and a conductive wire for transmitting data. The head/slider is attached to the flexure so as to enable an air bearing action to be generated by its pitching and rolling actions. Four wires will be provided for the HGA if the head is an MR one. Each of those wires is supported by an insulating material. One end of each wire is connected to an electrode pad of the head. This wire transmits data read by the head from a disk, or written by the head on the disk.

The HGA has a wiring configuration that is sometimes referred to as an over-the-top-looping type structure. In the case of such over-the-top-looping HGA, the head/slider is held at one surface of the load beam (head supporting surface) and each wire extended from the head connecting point passes through an aperture formed close to the front end of the load beam, then fixed on the other surface of the load beam (wire laying surface) at a wire fixing point between the head connecting point and the rear end of the load beam.

Each of the four wires forms a wire loop in a section between the head connecting point and the wire fixing point. For such an HGA, forming of the wire loop is indispensable so as to enable all the four wires to apply their bias pressures to the head/slider evenly. In order to achieve this, therefore, one end of each wire is connected to the head and an intermediate portion of the wire is fixed at the wire fixing point so as to form a wire loop as described above. The height of the wire loop from the wire laying surface of the load beam (hereafter, to be referred to as the wire height) is suppressed low and wire forming is always applied to each wire loop as described above.

FIG. 16 shows an example of the conventional wire forming in such the HGA. In FIG. 16,(a) and (b) are top views of the HGA in such a wire forming process. FIGS. 16(d) and 16(e) are cross sectional views of the HGA in correspondence to (a) and (b). FIG. 16(c) is also a cross sectional view of a wire forming pin 91 at the A–A' line (see (a)).

The HGA has a load beam 20, a flexure 30, a head/slider 40, and a wire cable consisting of four wires 61. An aperture 28 is formed close to the front end of the load beam 20 and the four wires 61 extended from the head connecting point edge H are passed through the aperture 28 and fixed at the wire fixing points F1 and F2 on the wire laying surface 21 of the load beam 20. Each wire loop 610f is formed in a section between the head connecting point edge H and each of the wire fixing points F1 and F2.

The wire forming pin 91 is tapered from the rear side 91a towards the front side 91b. The wire forming pin 91 thus has tapering surfaces 91c and 91d on both sides thereof, which are tapered towards the bottom surface 91f. This wire forming pin 91 is structured so that its bottom surface 91f comes in contact with the load beam 20 and the its front surface 91b comes to the side of the front end 24 of the load beam 20 as shown in FIG. 16(a) and FIG. 16(d).

The wire forming pin 91 structured as shown in FIG. 16(a) and FIG. 16(d) is moved towards the head connecting point edge H from the wire fixing point F(F1 and F2), thereby the end portion formed by the front surface 91b and the tapering surfaces 91c and 91d is put in contact with the wire loop 610f. While the wire loop 610f is widened more to the right and left sides, therefore, the wire loop 610f is moved towards the head connecting point edge H so as to deform the section close to the head connecting point edge H of the wire loop 610f plastically as shown in FIG. 16(b) and FIG. 16(e).

In the case of such the conventional HGA, however, a stress is concentrated on the wire positioned at the head connecting point edge H side in the wire forming process. And, if the difference between stresses applied at the front and at the rear of the wire forming pin is increased, the wire, trying to keep the balance of its force, goes away towards the rear of the wire forming pin. The wire is thus loosened in a section between a portion (a driving portion) to which a force is applied by the wire forming pin and the wire fixing point F, thereby the wire loop cannot be deformed enough plastically sometimes.

FIG. 17 is an example of a cross sectional view of the conventional HGA after its wire loop forming is ended. FIG. 17 is equivalent to the cross sectional view at the B–B' line in FIG. 16(i b). In FIG. 17, the wire loop 610fb, which is one of the four wire loops (610fa, 610fb, 610fc, and 610fd), is not deformed enough plastically and this wire loop 610fb causes the wire height HWf from the load beam 20 to be increased. The wire height HWf is the maximum height of the four wire loops 610f from the wire laying surface 21.

If the wire height cannot be reduced because of insufficient plastic deformation of the wire loop, the HGA clearance from the disk apparatus housing is reduced. If the disk apparatus includes a plurality of disks, the clearance between HGA's is also reduced. In addition, if a variation of plastic deformation is generated among wire loops, the bias pressure of each wire is also varied from others, causing the static attitude of the head/slider to become unstable. The static attitude of the head/slider means a position of the head/slider taken with respect to the load beam while the head/slider does not fly above the surface of the disk.

The conventional HGA wire laying structure has such problems that must be solved in order to further reduce the structure of the disk apparatus in thickness, as well as further stabilize the static attitude of the head/slider.

SUMMARY OF THE INVENTION

The head gimbal assembly (HGA) of the present invention is provided with a slider that flies above the surface of a disk, and a head for reading/writing data from/onto the surface of the disk. One or more conductive wires are connected to the head and are used to transmit data. A load beam supports the wire(s) thereon and holds the head/slider near a front end of the load beam. The rear end of the load beam is supported by an actuator. Each of the wires is fixed at a point between the head connecting point edge and the rear end on the surface of the load beam. Each wire also forms a wire loop between the head connecting point edge and the wire fixing point. The distance between the head connecting point and the wire fixing point is set to about 2.7 to 3.8 mm.

In addition, the wire forming method applied for the HGA of the present invention includes a step for compressing a predetermined portion of each wire loop from above on the surface of the load beam, and a step for protruding the predetermined compressed portion towards the head connecting point edge, thereby plastically deforming a section between the head connecting point edge and the predetermined portion of the wire loop.

Furthermore, the HGA wire forming apparatus of the present invention is provided with means for moving a wire forming pin down onto the surface of the load beam, thereby letting the wire forming pin come in contact with a predetermined portion of the wire loop and compressing the predetermined portion, and means for rotating the wire forming pin that has compressed the predetermined portion towards the head connecting point edge, thereby extruding the predetermined portion towards the head connecting point edge.

Therefore, it is an object of the present invention to provide a wire laying structure for the HGA, which allows the wire height from the load beam to be reduced easily and surely.

It is another object of the present invention to provide a wire laying structure of the HGA, which allows the static attitude of the head/slider to be stabilized easily and surely.

It is an additional object of the present invention to provide an HGA wire forming method, which can allow the wire height to be reduced and stabilize the static attitude of the head/slider, as well as a wire forming apparatus that employs the method.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 15 illustrates a top view of an experiment for finding the distance between the head connecting point and the wire fixing point Eg in the HGA of the present invention;

DETAILED DESCRIPTION OF ILLUSTRATIVE EMBODIMENT

Figure 1:
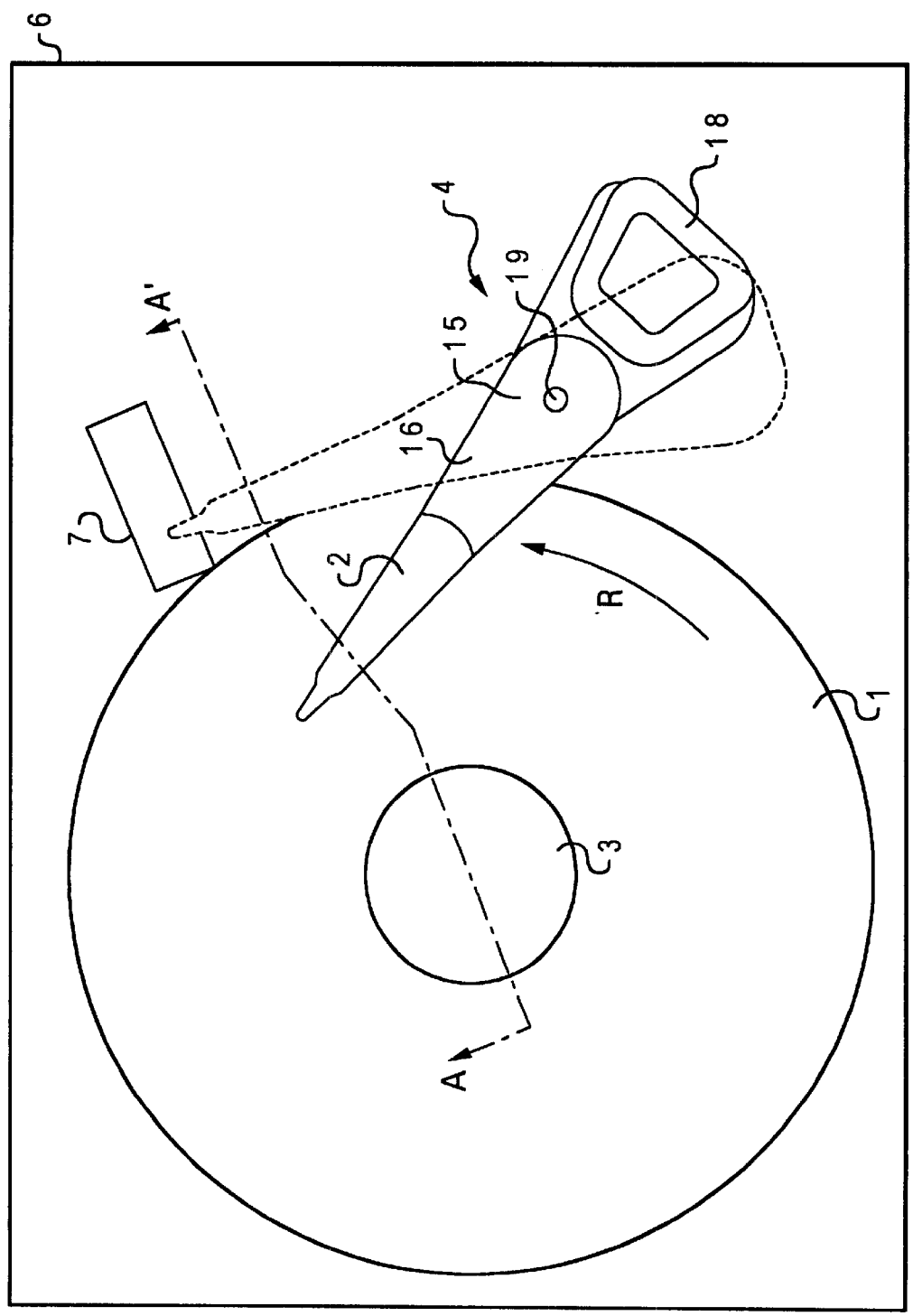
FIG. 1 is a top view of a disk apparatus constructed in accordance with the invention.
Figure 2:
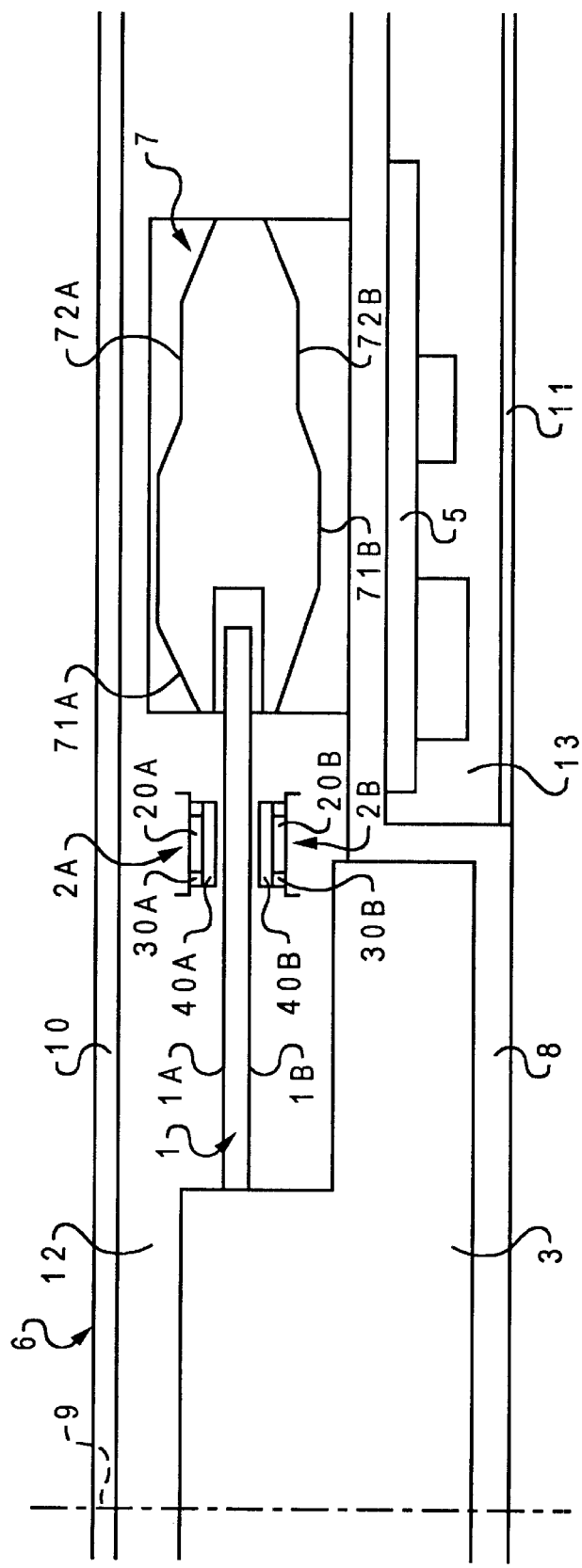
FIG. 2 is a sectional side view of the disk apparatus at the line A–A' in FIG. 1.
Figure 3:
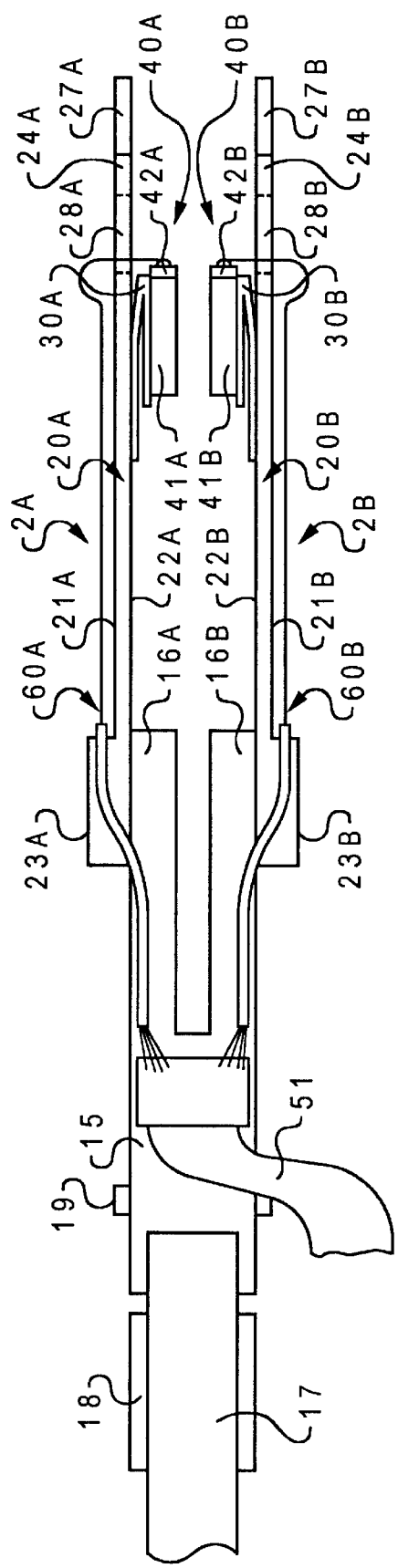
FIG. 3 is a side view of an HGA and an actuator shown in FIG. 1.

With reference now to the figures and in particular with reference to FIG. 1, there is depicted a plane view of a disk apparatus in an embodiment of the present invention. FIG. 2 is a cross sectional view of the disk apparatus at the A–A' line shown in FIG. 1. FIG. 3 is a side view of a head gimbal assembly (HGA) 2 and an actuator 4 shown in FIG. 1 respectively. In FIG. 1, a cover 10 shown in FIG. 2 is removed from the disk apparatus.

The disk apparatus shown in FIG. 1 to FIG. 3 is provided with a disk 1, which is a data recording medium; an HGA 2; a spindle motor 3 for rotating the disk 1; an actuator 4 for supporting and rotating the HGA 2; a card assembly 5; a housing 6; a load/unload (LUL) lamp 7 for supporting the tip of the HGA 2 when the disk 1 stops its rotation; and other non-illustrated items.

The housing 6 is composed of a base 8 and covers 10 and 11. The base 8 composes the frame of the disk apparatus. Inside the base 8 (upper side) is formed a downward recess 12, which is half-covered by the cover 10 so as to become a half-closed space. In this recess 12 are housed the disk 1, the HGA 2, the spindle motor 3, and the actuator 4. Outside the base 8 (lower side) is formed an upward recess 13 used to house the card assembly 5. The card assembly 5 is covered by the cover 11.

The card assembly 5 is provided with a driving circuit for the spindle motor 3, a driving circuit for a voice coil motor (VCM) composing the actuator 4, a data reading/writing circuit, and a main control circuit for controlling those circuits, and other items. The disk 1 is fixed to a spindle shaft 9 of the spindle motor 3. This disk 1 is rotated by the spindle motor 3 in the direction of the arrow R around the spindle shaft 9 disposed vertically to both base 8 and cover 10. The disk 1 has two surfaces for recording data; upper surface 1A and lower surface 1B.

The words "upper side" and "lower side" used here are just for convenience's sake in description; they do not mean necessarily the orientation of the disk apparatus just as it is illustrated. And, if members are provided on the surface 1A or 1B of the disk apparatus 1, a subscript "A" or "B" will be added to those provided on the surface 1A or 1B.

The actuator 4 is provided with an actuator body 15 and an actuator coil 18. The actuator body 15 is supported rotationally by the shaft 19 fixed to the frame of the disk apparatus. The actuator body 15 has actuator arms 16 (16A and 16B) formed unitarily with the actuator body 15. At the tip of each of the actuator arms 16 is fixed the HGA 2 (2A, 2B). The actuator body 15 also has coil arm 17 formed unitarily with the actuator body 15. An actuator coil 18 is attached to this coil arm 17. This coil 18 is combined with a permanent magnet (not illustrated) to compose a VCM.

The HGA 2(2A, 2B) is provided with a load beam 20 (20A, 20B), a flexure 30 (30A, 30B), and a head/slider 40 (40A, 40B), and a wire cable 60 (60A, 60B) provided with four wires used for transmitting data respectively. The rear end 23 (23A, 23B) of the load beam 20 is attached to the tip of the actuator arm 16. At the front end 24 (24A, 24B) of the load beam 20 is provided a load/unload (LUL) tab 27 (27A, 27B).

The head/slider 40 is obtained by embedding an MR head 42 (42A, 42B) in the slider 41 (41A, 41B) that flies above the surface of the disk by the aid of an air bearing surface. The slider 41 is used for reading or writing data from/onto the surface of the disk in a non-contact manner. This head/slider 40 is attached to the head supporting surface 22 (22A, 22B) of the load beam 20 via the flexure 30.

One end of the wire cable 60 is connected to the head 42 of the head/slider 40 and the other end of the wire cable 60 is connected to the other end of the cable 51 of a flexible printed circuit (FPC). One end of the FPC cable 51 is attached to one side of the actuator body 15 and the other end is connected to the card assembly 5. The wire cable 60 extended from the connecting point edge of the head 42 is passed through the aperture 28 (28A, 28B) provided in the load beam 20, then passed above the wire laying surface 21 (21A, 21B) of the load beam 20, and further pressed on one side of the actuator arm 16. The wire cable 60 thus reaches the FPC cable 51. The FPC cable 51 and the wire cable 60 are connected to between the head 42 and the data reading/writing circuit provided for the card assembly 5, so that data is transmitted between the head 42 and the reading/writing circuit. The FPC cable 51 is also connected to between the VCM driving circuit provided in the card assembly 5 and the actuator coil 18.

The LUL lamp 7 has a composite surface 71 (71A, 71B) to be engaged with the tab 27 (27A, 27B) so as to unload the head/slider 40. The composite surface 71 includes a parking surface 72 (72A, 72B) for supporting the tab 21 when the head/slider 40 is unloaded.

In operation, the actuator 4 rotates the HGA 2 with a current supplied to the actuator coil 18. The head/slider 40 is thus moved in the radial direction of the disk 1. In the loading sequence of the head/slider 40, the actuator 4 rotates the HGA 2 inward in the radial direction of the disk 1, thereby the head/slider 40 is loaded on the disk surface. The tab 27 of the HGA 2 supported on the parking surface of the LUL lamp 7 slides on the composite surface 71 inward in the radial direction of the disk 1. Then, the head/slider 40 floats due to the air bearing action generated by both disk 1 and slider 41, thereby the tab 27 is separated from the inclined portion of the composite surface 71 at the disk 1 side.

The load beam 20 and the head/slider 40 supported by the flexure 30, when loaded onto the disk surface respectively, fly close to the disk surface due to the above air bearing surface and move on the disk surface to read/write data from/to divided areas on the disk surface. The head 42 reads data recorded on the disk surface or writes data on the disk surface.

In the unloading sequence of the head/slider 40, the actuator 4 rotates the HGA 2 outward in the radial direction of the disk 1, thereby the head/slider 40 is unloaded from the disk surface to a refuge position. The tab 27 of the HGA 20 is engaged with the inclined portion of the composite surface 71 at the disk 1 side, the HGA 2 slides on the composite surface 71 outward in the radial direction of the disk 1, reaching the parking surface 72.

Hereafter, the HGA 2 will be described more in detail. The HGA 2 enables the head/slider 40 to work with the aid of the air bearing surface, as well as data transmission to be done between the head 42 and the reading/writing circuit of the card assembly 5 through the wire cable 60.

Figure 4A:
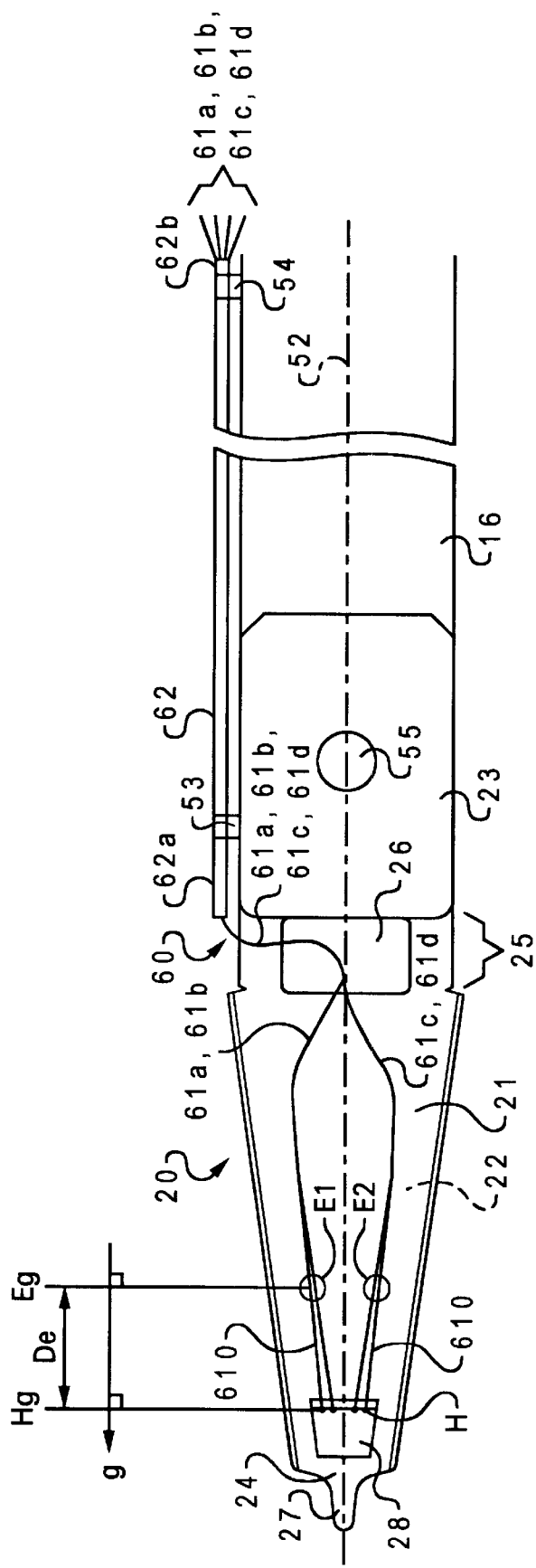
FIGS. 4(a) and 4(b) are top and side views of a structure of the HGA.
Figure 4B:
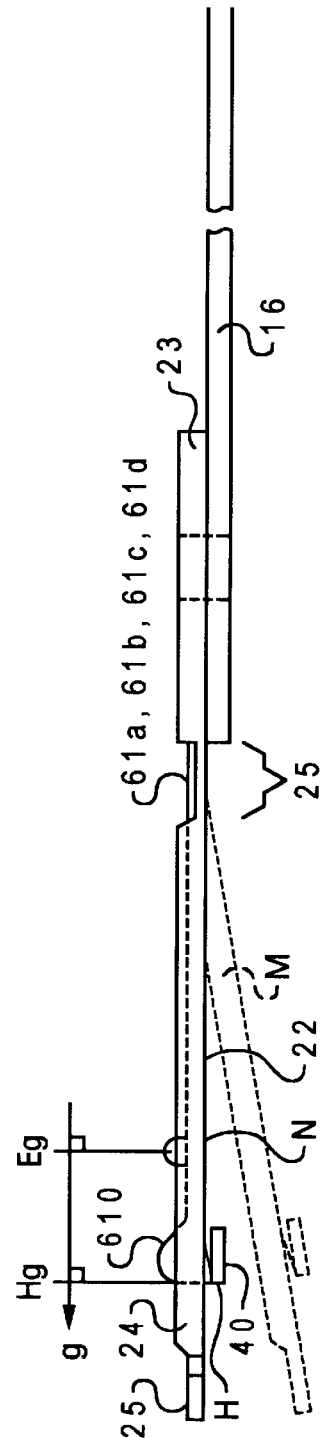
Figure 5A:
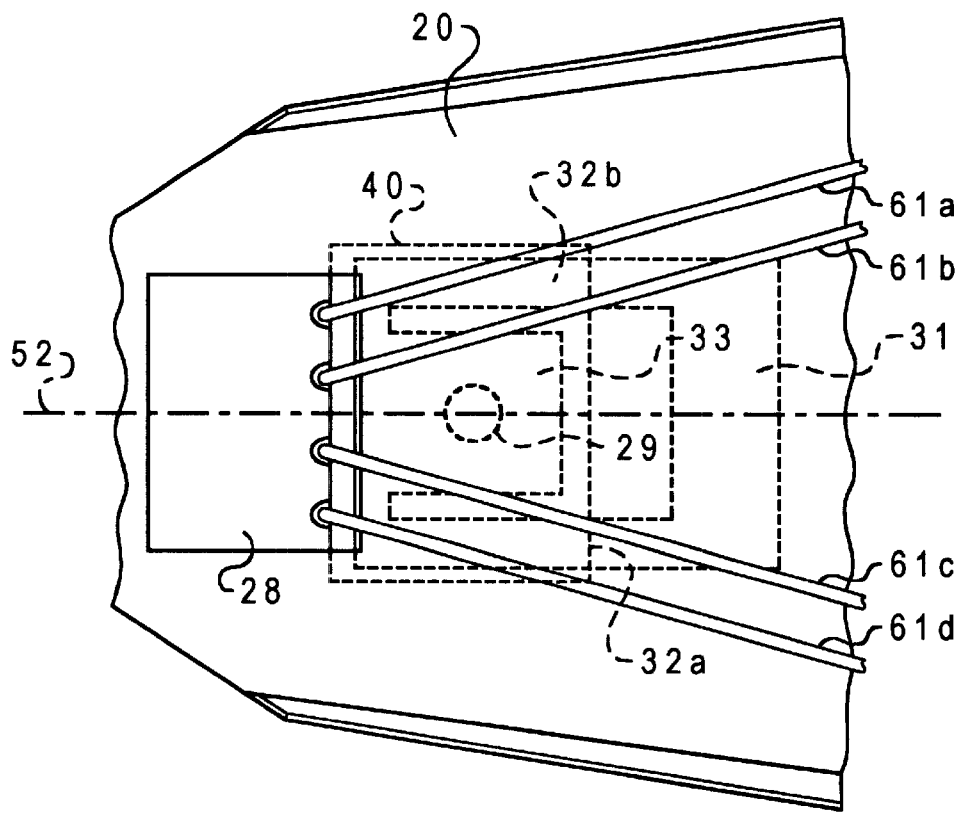
FIGS. 5(a) and 5(b) are enlarged top and side views of a portion of the HGA.
Figure 5B:
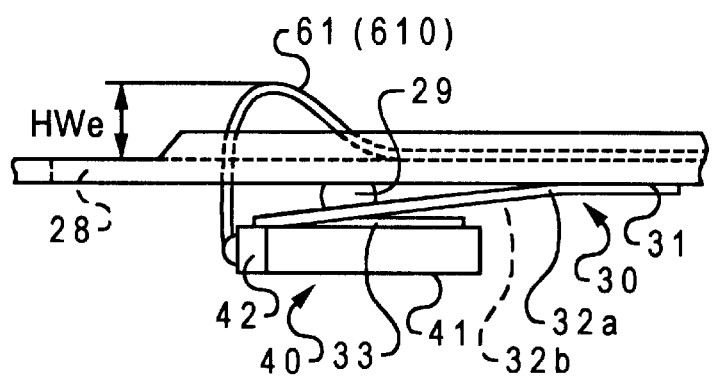

FIG. 4 shows a structure of the HGA 2. FIG. 4(a) is a top view and FIG. 4(b) is a side view. FIG. 5 is an expanded view of the HGA 2 around its tip. FIG. 5(a) is a top view and FIG. 5(b) is a side view of the HGA 2 around its tip.

In FIGS. 4 and 5, the load beam 20 is tapered from the rear end 23 towards the front end 24. The load beam 20 is shaped symmetrically at both sides of the center axis 52 extended from the rear end 23 towards the front end 24. The rear end 23 of the load beam 20 is attached to the tip of the actuator arm 16. An aperture 26 is formed in a hinge area 25 positioned close to the rear end 23. Around the front end 24 on the supporting surface 22 of the load beam 20 is formed a dimple 29 and the flexure 30 for holding the head/slider 40. The hinge area 25 functions as a plate spring. The load beam 20, when the head/slider 40 does not fly above the disk surface, is posed like a letter of M as shown in FIG. 4(b) due to the function of the hinge area 25. When the head/slider 40 flies above the disk surface, the air bearing action generated between the disk surface and the head/slider 40 causes the front end 24 to rise and pose like a letter of N as shown in FIG. 4(b).

The flexure 30 is obtained by forming a rear portion 31, long and slender flexible leg portions 32a and 32b, and a tongue-like portion 33 unitarily. The flexure rear portion 31 is bonded to the head supporting surface (the lower surface in FIG. 5(b)) of the load beam 20 with an adhesive or the like. The leg portions 32a and 32b of the flexure are extended obliquely from both ends of the rear portion 31. The tongue-like portion 33 of the flexure is linked to the tips of both leg portions 32a and 32b of the flexure extended obliquely and in the direction of the rear portion 31 from there.

The head/slider 40 is bonded to the tongue-like portion 33 of the flexure with an adhesive or the like. This tongue-like portion 33 of the flexure is pressed lightly by the leg portions 32a and 32b of the flexure against the dimple 29 of the head supporting surface 22. The leg portions 32a and 32b, as well as the tongue-like portion 33 of the flexure are cooperating to hold the head/slider 40 so that the head/slider 40 can make pitching and rolling actions, thereby generating an air bearing action. The dimple 29, coming in contact with the tongue-like portion 33 of the flexure, enables the head/slider 40 to make a gimbal action.

The wire cable 60 consists of four conductive wires 61 (61a to 61d) and a tube 62 composed of an insulating material. The four wires 61 are covered by an insulating material respectively. Those four wires 61 cannot be deformed plastically with a small stress because of the elastic insulating material. However, if those wires 61 are composed of a flexible conductive material respectively, they can be deformed plastically with a small stress. The wire cable 60 has a section in which the four wires 61 sheathed by an insulating material respectively are further covered together by the tube 62. Both sides of the tube 62 are fixed to dampers 53 and 54 respectively. The dampers 53 and 54 are provided at one side of the load beam 20 and at one side of the actuator arm 16 respectively. The insulating material is removed from the ends of the four wires 61 extended from the tube end 62b, which are connected to electrode pads of the FPC cable 51 respectively.

The four wires 61 extended from the tube end 62a are led onto the wire laying surface 21. The four wires 61, bound by an insulating material, are divided into two groups; the first group consisting of wires 61a and 61b and the second group consisting of wires 61c and 61d in the hinge area 25.

The wires 61a and 61b of the first group are fixed by a UV dot at the first fixing point E1 on the wire laying surface 21. The wires 61c and 61d of the second group are fixed by a UV dot, etc. at the second fixing point E2 on the wire laying surface 21. The above UV dot is composed of an adhesive hardened by an irradiated ultra-violet ray.

The two wires 61a and 61b bound by an insulating material are separated before and behind the first fixing point E1. The two wires 60a, 60b bound by an insulating material are separated before and behind the second fixing point E2.

The four wires 61a to 61d extended from the wire fixing points E (E1 and E2), then separated as described above are led into the aperture 28 from the wire laying surface 21 side. The insulating material is removed from the ends of those four wires 61a to 61d and those ends are connected to four electrode pads of the head 42 respectively by means of an ultrasonic welding method, or the like. The wires 61a and 61b of the first group extended from the first fixing point E1 to the head 42 and the wires 61c and 61d of the second group extended from the second fixing point E2 to the head 42 are disposed symmetrically at both sides of the center axis 52 of the load beam 20. The section between the head connecting point edge H of the four wires 61 and each of the wire fixing points E is formed as a wire loop 610 respectively.

At this time, as shown in FIG. 4, a g-axis is disposed in parallel to the center axis 52 of the load beam 20, then a point corresponding to the head connecting point edge H on the g-axis is defined as a head connecting point Hg and a point corresponding to the wire fixing point E on the g-axis is defined as a wire fixing point Eg. The center axis 52 of the load beam 20, when the load beam is posed like a letter of N as shown in FIG. 4(b), goes almost in parallel to the wire laying surface 21 of the load beam 20.

The HGA 2 of the present invention is characterized by that the distance De between the head connecting point Hg and the wire fixing point Eg is set to about 3.8 mm or under. In addition, the HGA of the present invention is characterized by that the above distance De is set to about 2.7 mm or over. In this embodiment, the distance De between the head connecting point Hg and the wire fixing point Eg is set to 3.25 mm.

The HGA 2 is manufactured as a single unit before it is attached to the actuator arm 16. The manufacturing process of the HGA 2 includes the following steps, which are carried out sequentially:

(a) A step for fixing the tube 62 of the wire cable 60 to the clamper 53 provided for the load beam 20, then fixing the flexure 30 to the head supporting surface 22 of the load beam 20 (wire laying process);

(b) A step for fixing the four wires 61a to 61d extended from the tube end 62a at the first and second fixing points E1 and E2 on the wire laying surface 21, then connecting those wires 61a to 61d to the head 42;

(c) A step for attaching the head/slider 40 to the flexure 30; and (d) A step for forming the four wire loops 610 (in a section between each wire fixing point E of the four wires 61 and the head connecting point edge H) (wire forming step).

Figure 6:
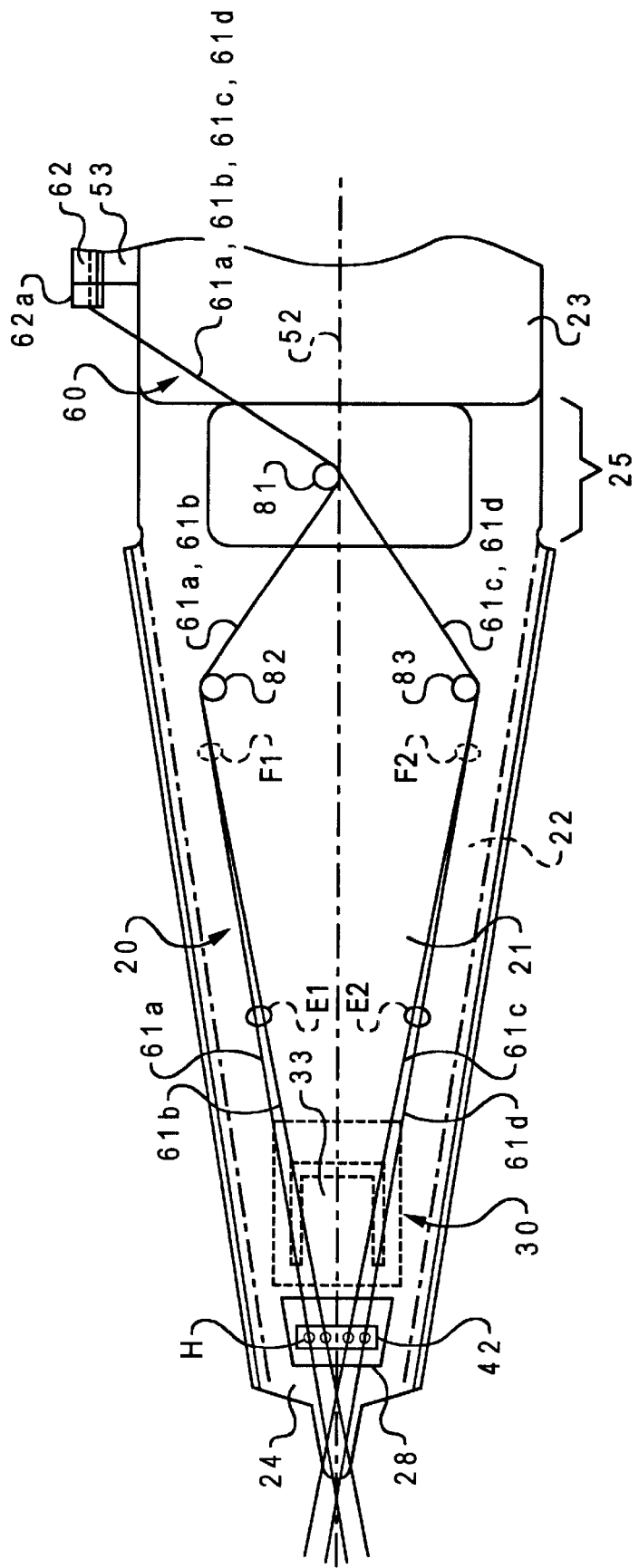
FIG. 6 is a top view of the HGA for describing a wire laying process.
Figure 7:
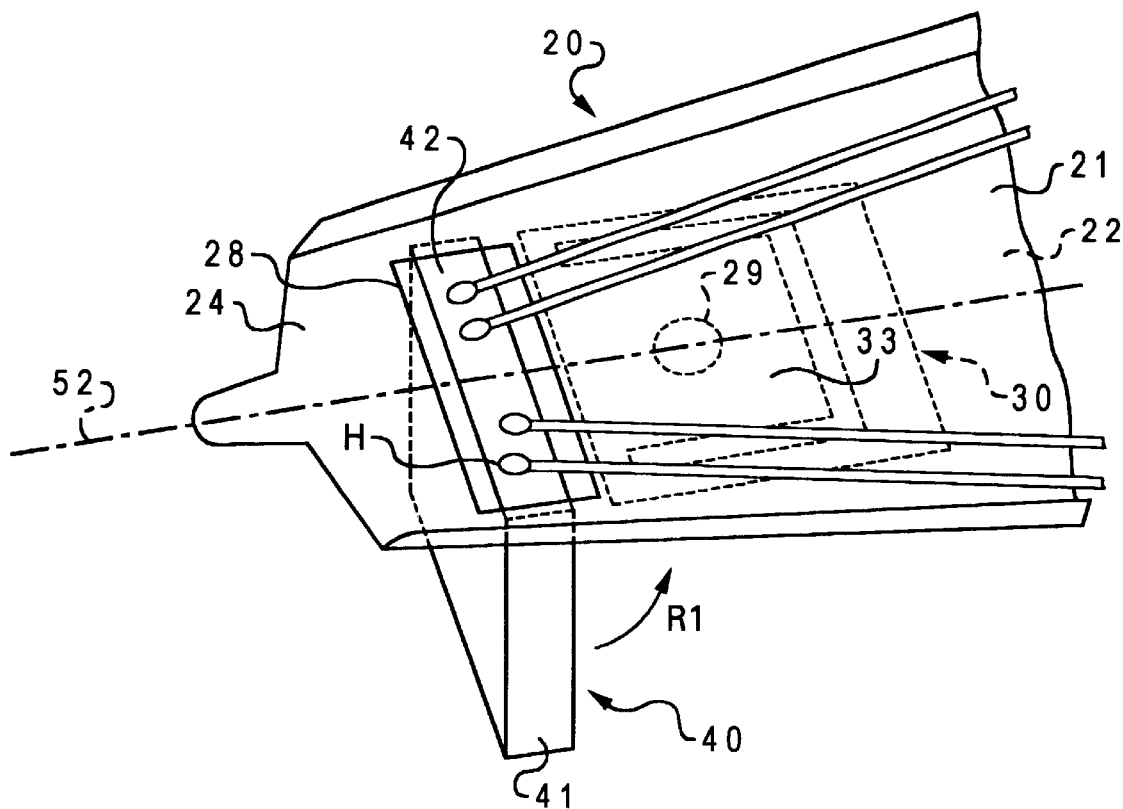
FIG. 7 is a perspective view of the HGA for describing a process for connecting wires to the head and attaching the head to a flexure.
Figure 8:
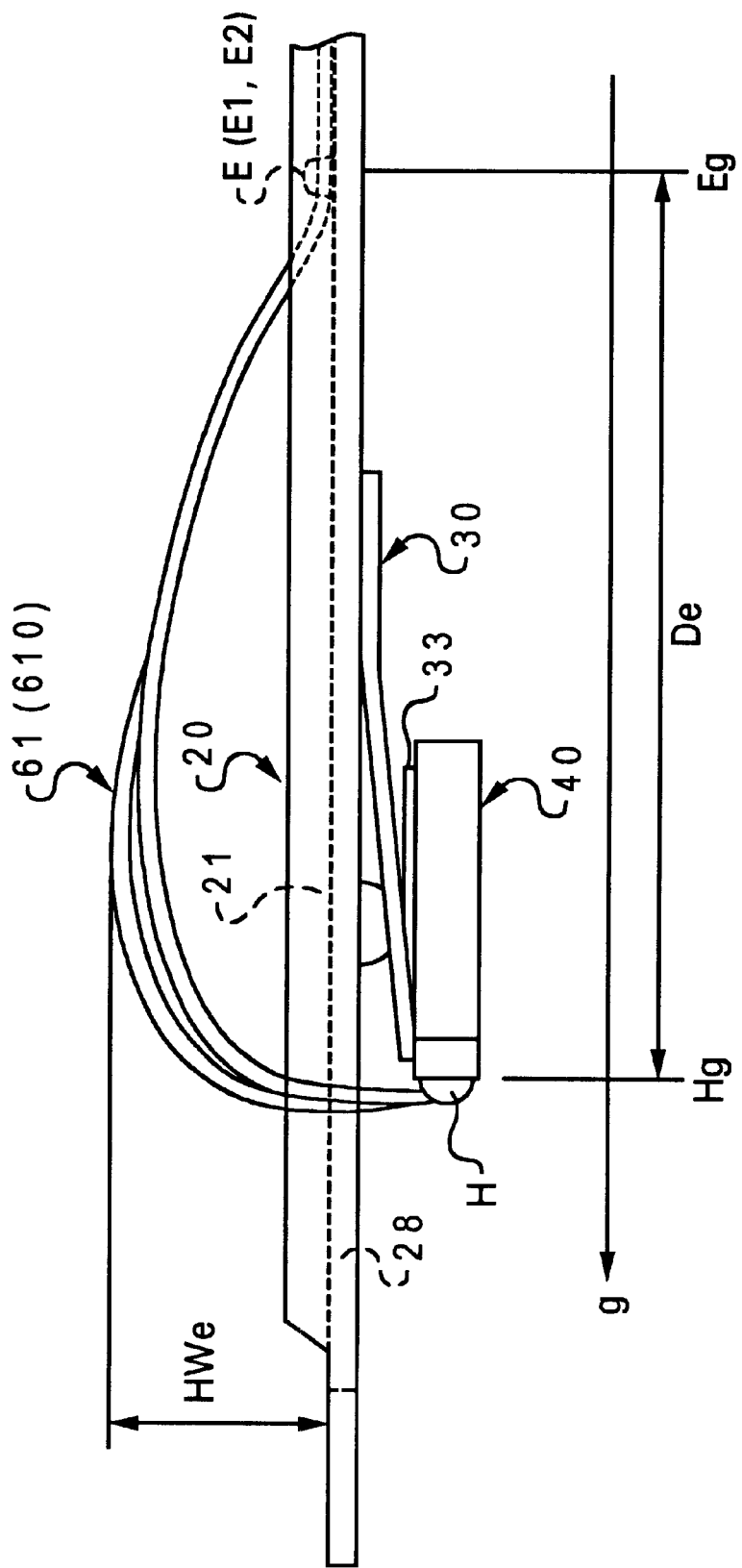
FIG. 8 is an enlarged side view of the HGA for describing a process for attaching the head to the flexure.

The manufacturing process of the HGA 2 is described below in detail with reference to the wire laying step (b) and the wire forming step (d). FIG. 6 is a top view of the HGA 2 for describing how to connect the wire 61 to the head 42 and lay the wires 61. FIG. 7 is a perspective view of the HGA 2 for describing how to connect the wire 61 to the head 42 and attach the head 42 to the flexure 30. FIG. 8 is a side view of the HGA 2 for describing how to attach the head 42 to the flexure 30.

At first, the flexure 30 is attached to the load beam 20, then the tube 62 of the wire cable 60 is attached to the damper 53. After this, the guides 81, 82, and 83 for guiding the four wires 61a to 61d are positioned on the load beam 20 as shown in FIG. 6. The guide 81 is positioned close to the center axis 52 of the hinge area 25 and the guides 82 and 83 are positioned symmetrically at both sides of the center axis 52 in an area closer to the front end 24 than the hinge area 25.

The four wires 61a to 61d extended from the tube end 62a are passed on the left side of the guide 81, then separated into two groups, the first group including the wires 61a and 61b and the second group including the wires 61c and 61d. The first group wires 61a and 61b are passed on the right side of the guide 82 and guided to the first fixing point E1 and the wires 61a and 61b are further separated before and behind the first fixing point E. The second group wires 61c and 61d are passed on the left side of the guide 83 and guided to the second fixing point E2, then separated before and behind the second fixing point E2. The above "left side" and "right side" mean "left side" and "right side" when they are viewed from the rear end 23 to the front end 24 in FIG. 6.

The wires 61a and 61b are fixed at the first fixing point E1 with a UV dot, etc. The wires 61c and 61d are fixed at the second fixing point E2 with a UV dot, etc. In addition, as shown in FIGS. 6 and 7, the head/slider 40 is positioned under the aperture 28 and erected so that the surface in which the head 42 is embedded faces the head supporting surface 22. Each of the four wires 61a to 61d extended from the first and second fixing points E1 and E2 is laid tightly so as to pass the corresponding electrode pad of the head 42 and connected to the electrode pad by means of an ultrasonic welding method, or the like. After this, the surplus length of each wire from the electrode pad is cut off.

The head/slider 40 is rotated by 90° towards the flexure 30 as shown with the arrow R1 in FIG. 7, then the top surface of the head/slider 40 is bonded on the bottom surface of the flexure tongue-like portion 33 with an adhesive or the like as shown in FIG. 8. The four wires 61 laid between the wire fixing point E and the head connecting point edge H are bent as the head/slider 40 is rotated, then each of those wires 61 forms a wire loop 610 on the wire laying surface 22 of the load beam 20 as shown in FIG. 8. In addition, when the head/slider 40 is attached to the flexure 30, the head connecting point edge H is moved back from the point shown in FIG. 7.

Because each wire loop 610 is formed irregularly in shape, the wire loops 610 come to add different bias pressures on the head/slider 40. With those different bias pressures, the static attitude of the head/slider 40 goes unstable. In addition, the wire height HWe is increased, thereby the clearance from the housing 6 of the disk apparatus is narrowed. In order to prevent these problems, therefore, wire forming is applied to each of the four wire loops 610 so that the wire is deformed plastically, thereby the wire height HWe is reduced as shown in FIG. 5 and the clearance of each wire loop 610 from the housing 6 is increased. The four wire loops 610 can thus apply the same bias pressure on the head/slider 40, thereby stabilizing the static attitude of the head/slider 40. The static attitude of the head/slider 40 means a position of the head/slider 40 to be taken with respect to the load beam 20, which receives no air bearing action. The wire height HWe is the maximum height of the four wire loops 610 from the wire laying surface 21.

Figure 9A:
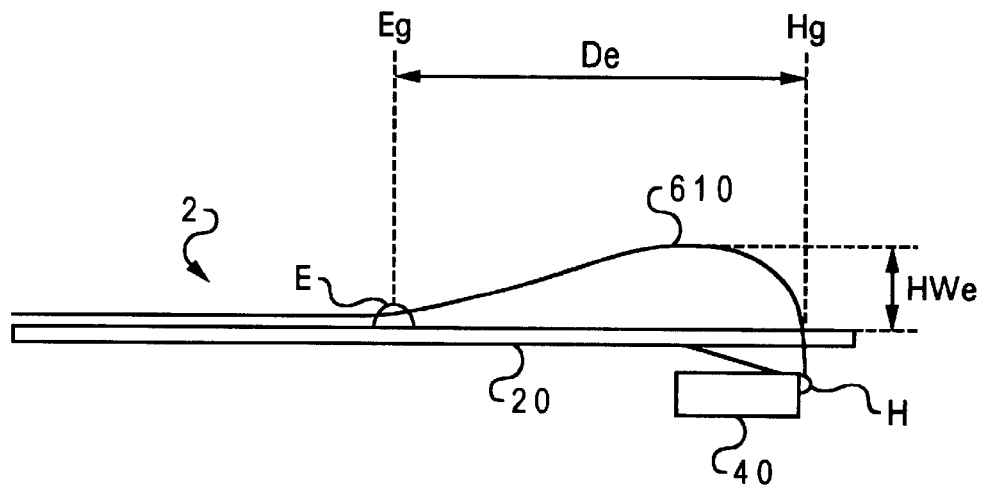
FIGS. 9(a) and 9(b) are side view comparisons of the HGA of the present invention and a prior art HGA for comparing the distance between the head connecting point and the wire fixing point, as well as the wire length between those HGA's.
Figure 9B:
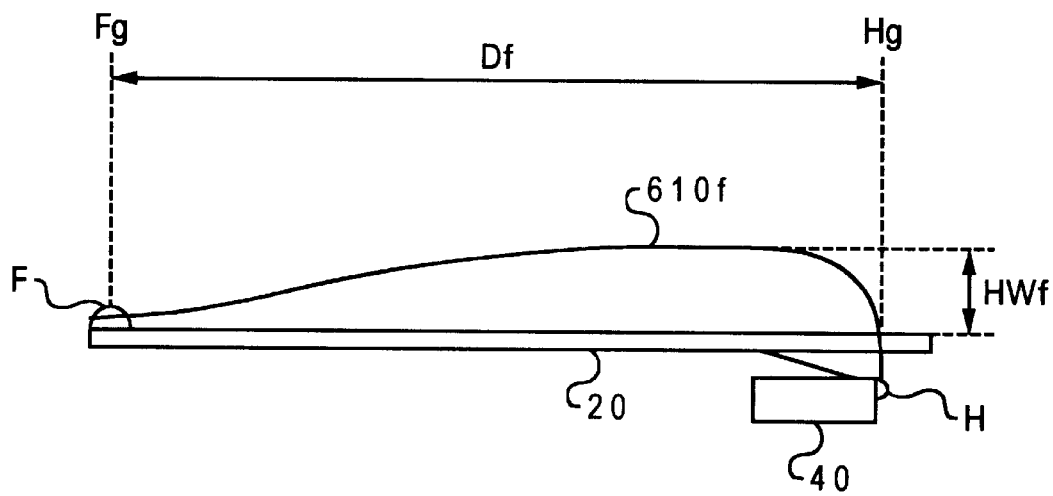
Figure 10:
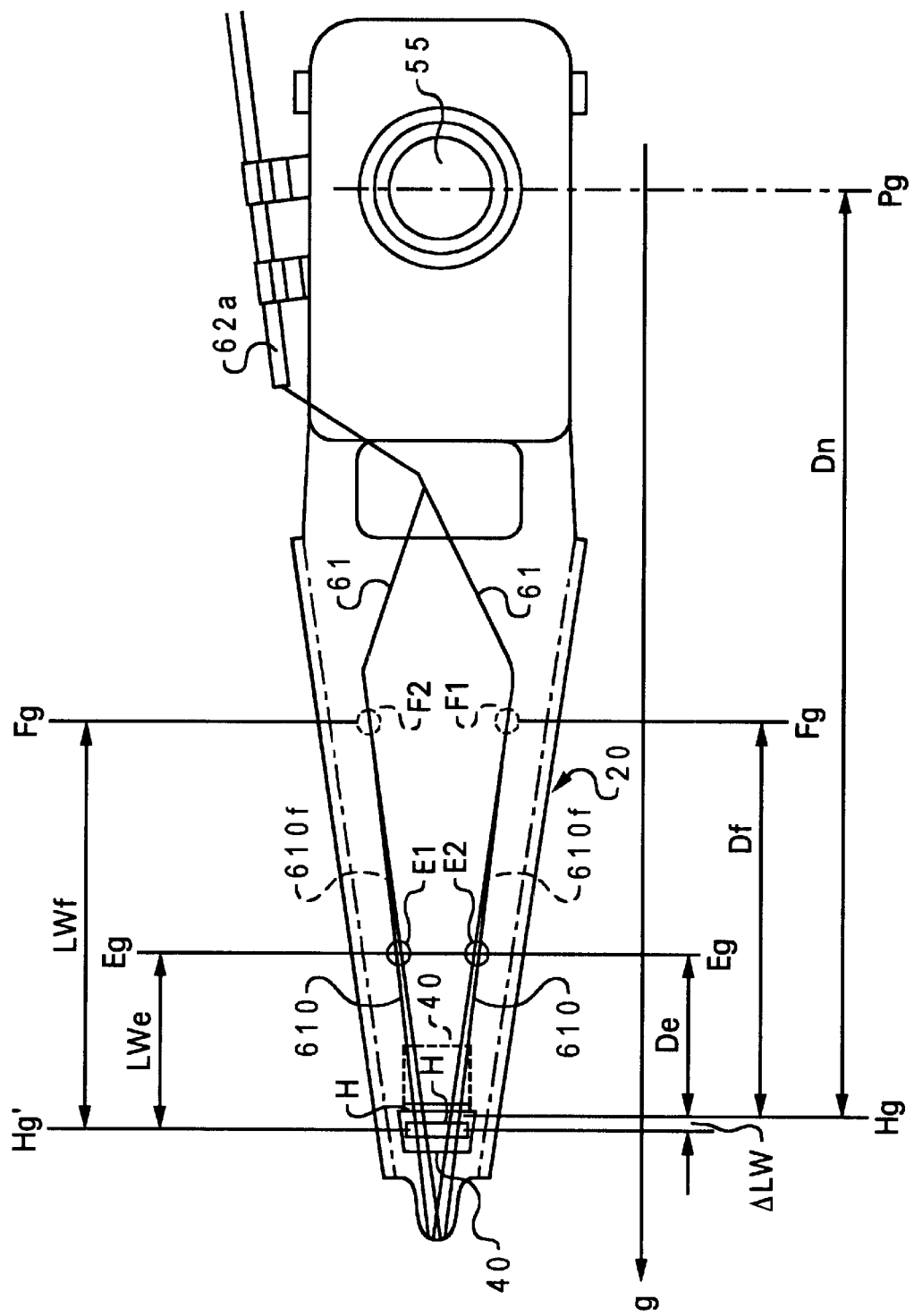
FIG. 10 is a superimposed top view of the HGA of the present invention and the prior art HGA of FIGS. 9(a) and 9(b) for comparing the distance between the head connecting point and the wire fixing point, as well as the wire length between those HGA's.

FIGS. 9 and 10 illustrate the distance between the wire fixing point and the head connecting point, as well as the wire length for the HGA2 of the present invention and those for the conventional HGA. FIG. 9 is a cross sectional view of a wire loop before the wire forming is applied to it. FIG. 10 illustrates the head/slider 40 and the head connecting point edge H disposed as shown in FIG. 7, as well as the head/slider 40 attached to the flexure and the head connection point edge H.

In FIG. 9, HWe is a wire height in the HGA2 of the present invention and HWf is a wire height in the conventional HGA. In this case, no wire forming is applied to none of HWe and HWf. The wire height HWe in the HGA2 is almost equal to the wire height HWf in the conventional HGA.

In FIGS. 9 and 10, Hg is a head connecting point in both the HGA2 of the present invention and the conventional HGA. Eg is a wire fixing point in the HGA2 and Fg is a wire fixing point in the conventional HGA. De is the distance between the wire fixing point Eg and the head connecting point Hg. Df is the distance between the wire fixing point Fg and the head connecting point Hg. Those Hg, Eg, Fg, De, and Df are all obtained on the g-axis.

Hg' indicates the head connecting point edge H (see FIG. 7) on the g-axis before the head/slider 40 is attached to the flexure. The distance LWe between this point Hg' and the wire fixing point Eg is equal to the length of the wire 61 between the wire fixing point E and the head connecting point edge H in the HGA2. In the same way, the distance LWf between the point Hg' and the wire fixing point Fg is equal to the length of the wire 61 between the wire fixing point F and the head connecting point edge H in the conventional HGA. Hereafter, LWe and LWf will be referred to as a wire length (a wire loop length) between a wire fixing point and a head connecting point respectively. DLW indicates the distance between the point Hg' and the head connecting point Hg. The distance DLW is equal to a surplus length of each wire that forms a wire loop.

Because the wire fixing points E (E1 and E2) of the HGA2 are provided closer to the front end of the load beam 20 than the wire fixing points F (F1 and F2) of the conventional HGA, the distance De between the wire fixing point Eg and the head connecting point Hg in the HGA2 is shorter than the distance Df between the wire fixing point Fg and the head connecting point Hg in the conventional HGA. The distance De in the HGA2 is 3.8 mm or under. In this embodiment, the De is set to 3.25 mm. In addition, because LWe=De+ΔLW and LWf=Df+ΔLW are satisfied, the wire length LWe in the HGA2 is shorter than the wire length LWf in the conventional HGA. In this embodiment, ΔLW is 0.31 mm and LWe is 3.56 mm.

In the HGA 2 in this embodiment, the distance De between the wire fixing point Eg and the head connecting point Hg is set to 3.25 mm, which is shorter than that of the conventional HGA as described above. In addition, in the HGA2 in this embodiment, the wire loop length LWe is set to LWe=3.56 mm, which is shorter than that of the conventional HGA. If the wire forming of the present invention to be described below and the wire forming of the conventional HGA are applied to each wire, therefore, the looseness of each wire loop 610 is reduced in a section between the pressing point of the wire loop 610 and the wire fixing point E. Consequently, it is possible to deform the section plastically close to the wire loop head connecting point edge easily and surely. And, the wire height HWe can also be reduced easily and surely. In addition, because the bends of the four wire loops close to the head connecting point edge can be unified in shape, the static attitude of the head/slider 40 can be stabilized easily and surely. In FIG. 10, the distance Dn between the center point Pg of the fixing hole 55 and the head connecting point Hg is set as Dn=19.50 mm in this embodiment. In FIG. 1, the diameter of the disk 1 is set to about 3.5 inches in this embodiment.

Figure 11:
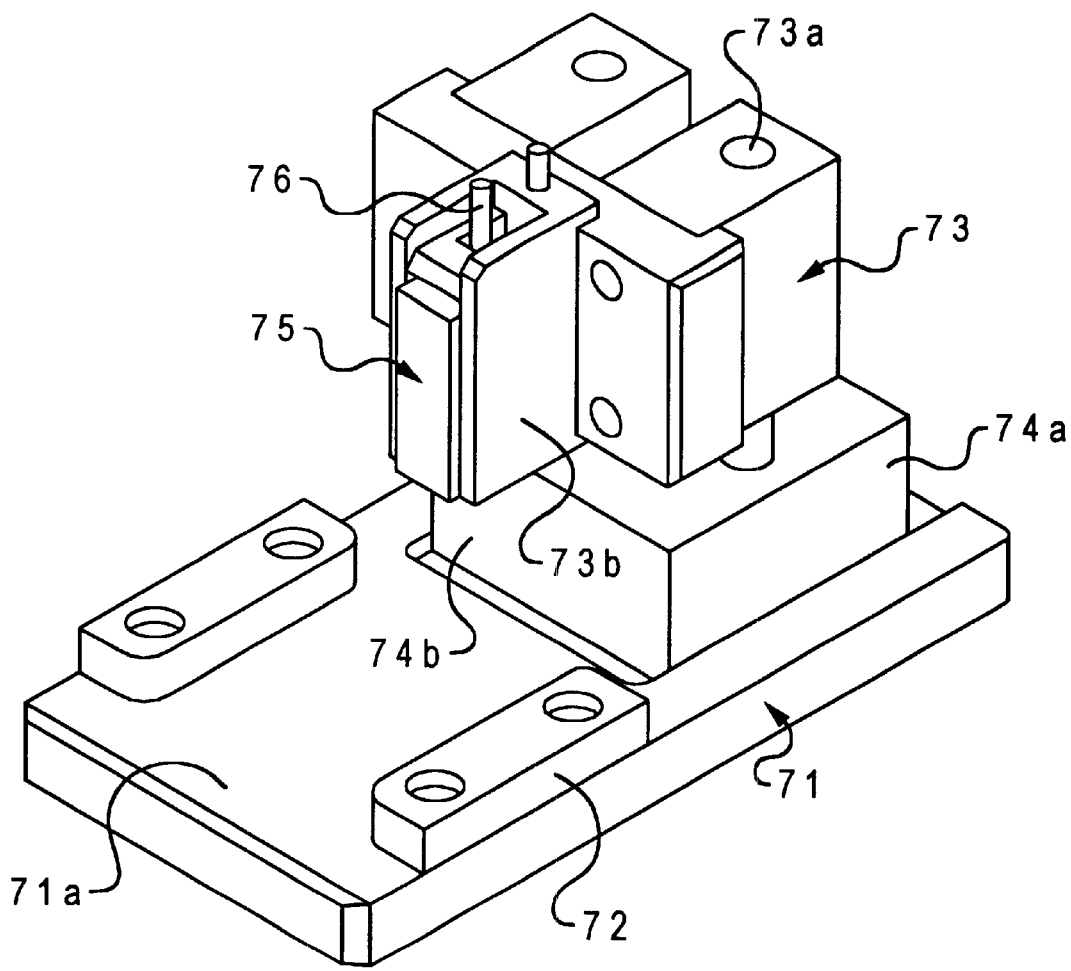
FIG. 11 is a perspective view of a structure of a wire forming apparatus used for the wire forming process.
Figure 12:
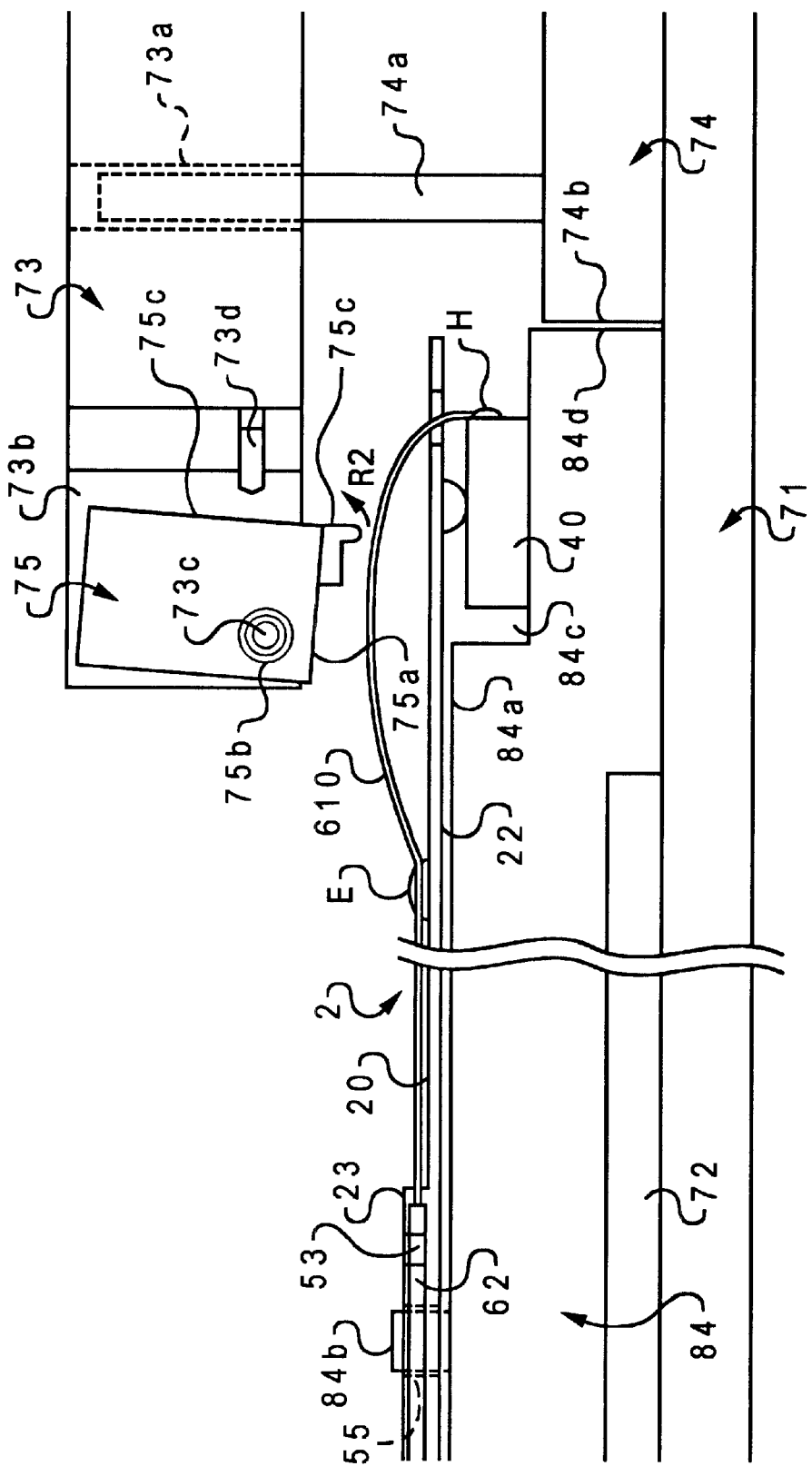
FIG. 12 is a side view of the wire forming apparatus shown in FIG. 11, wherein the HGA for which wire forming is to be done is set.
Figure 13A:
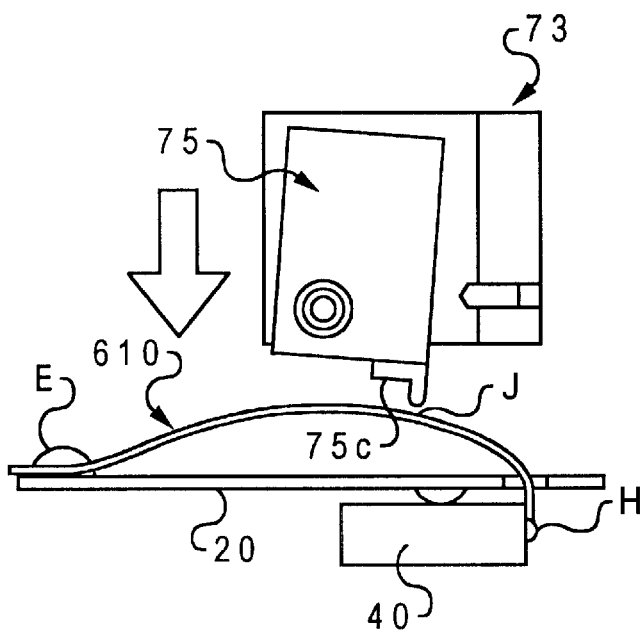
FIGS. 13(a)–13(d) illustrate top views of the wire forming process to be carried out by the wire forming apparatus of FIG. 11.
Figure 13B:
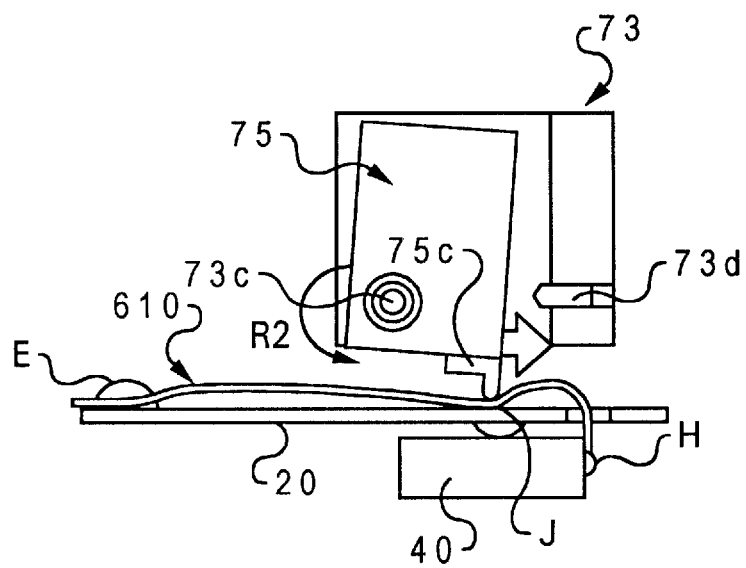
Figure 13C:
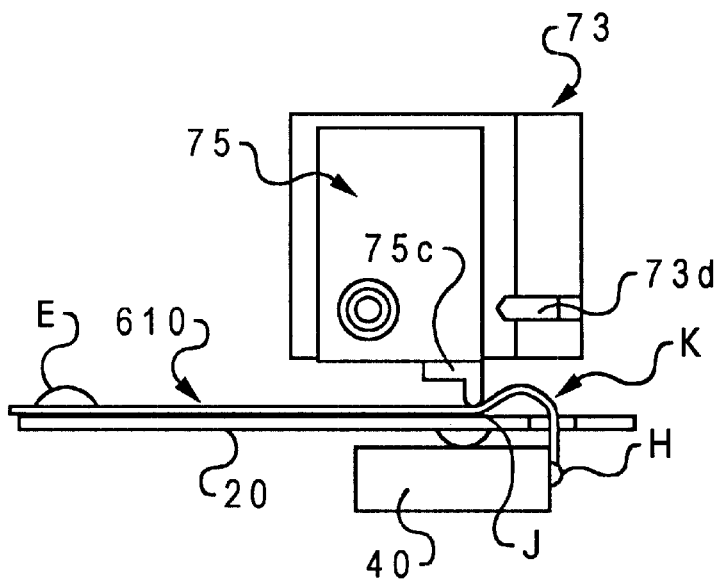
Figure 13D:
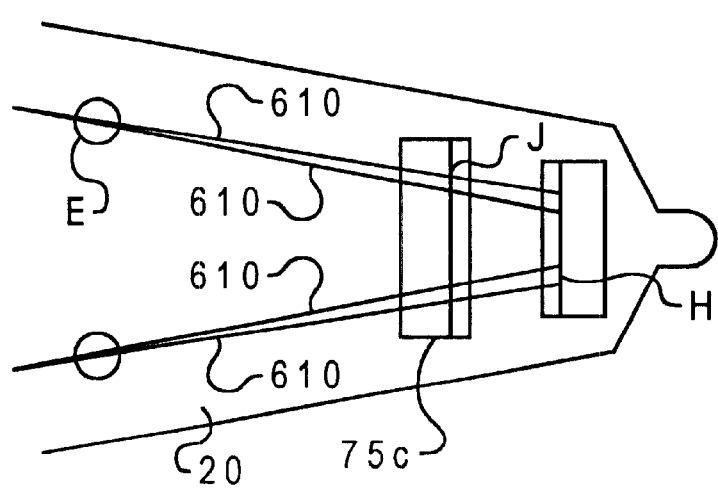
Figure 14A:
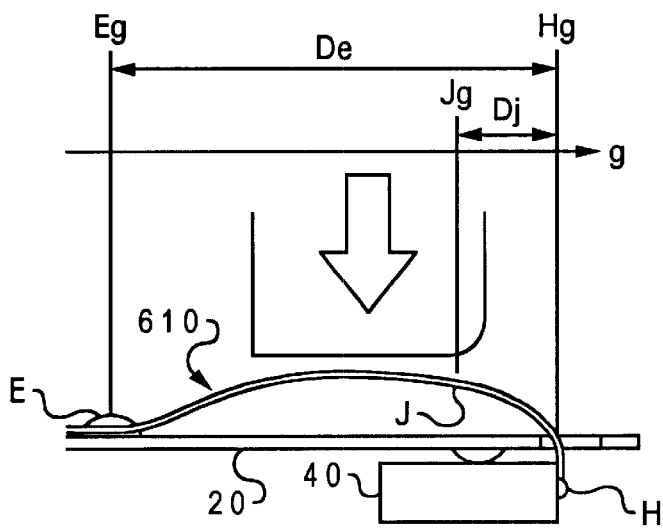
FIGS. 14(a)–14(c) illustrate side views of the wire forming process.
Figure 14B:
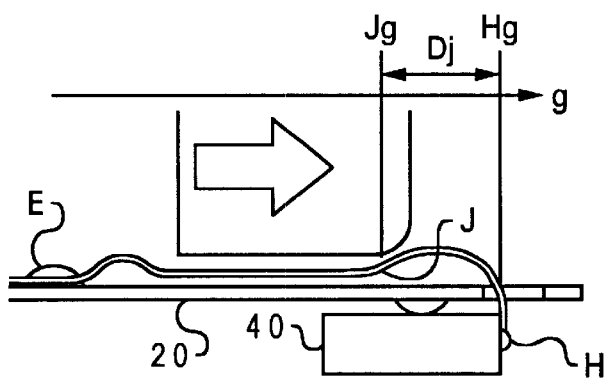
Figure 14C:
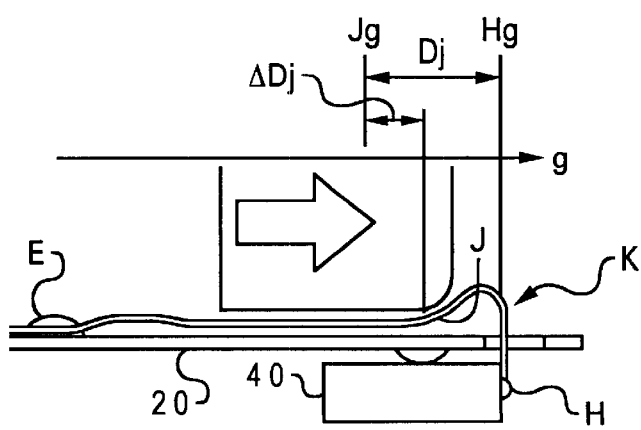
Figure 16A:
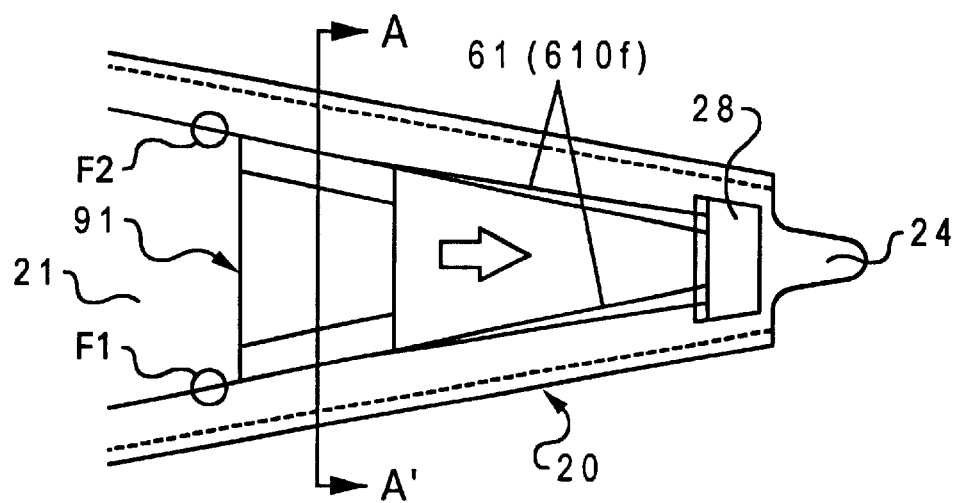
FIGS. 16(a)–16(e) illustrate a prior art wire forming process for the conventional HGA.
Figure 16B:
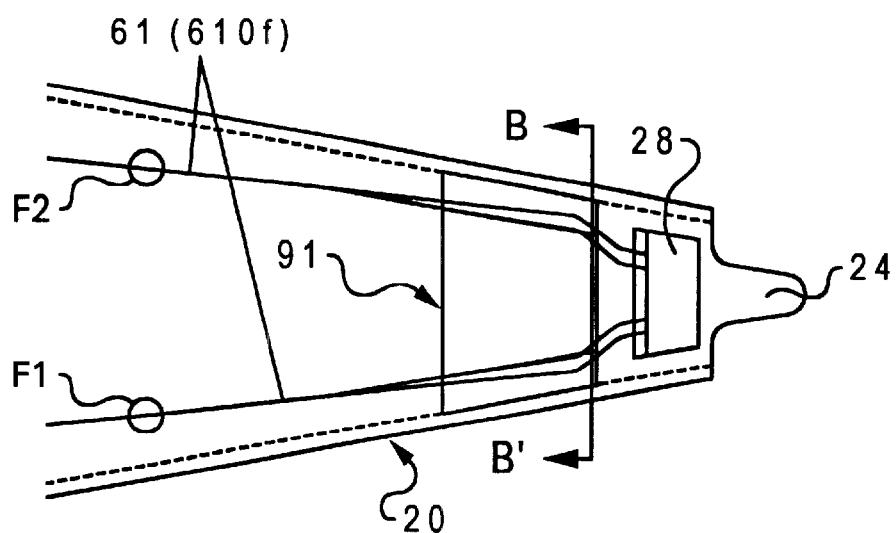
Figure 16C:
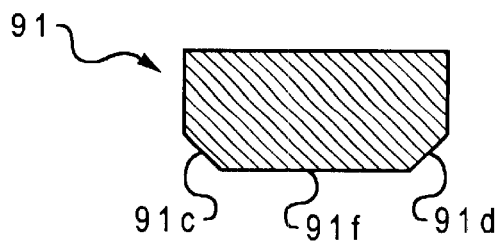
Figure 16D:
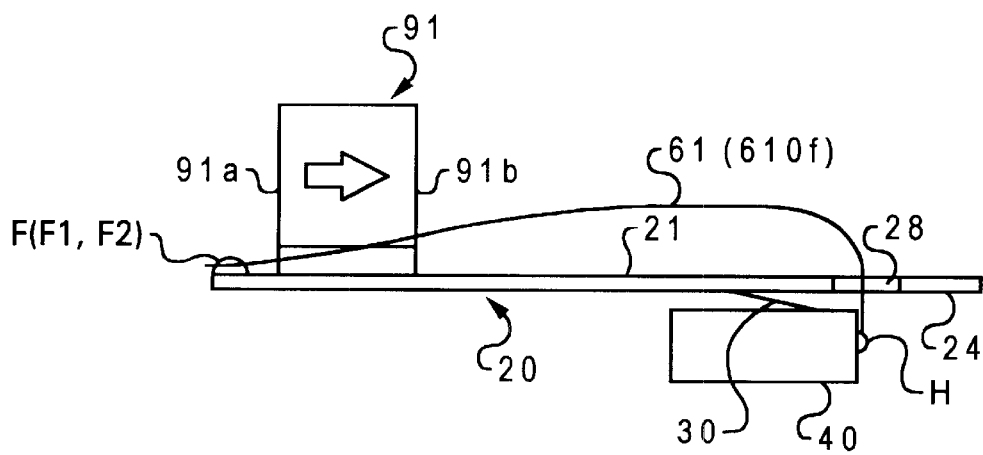
Figure 16E:
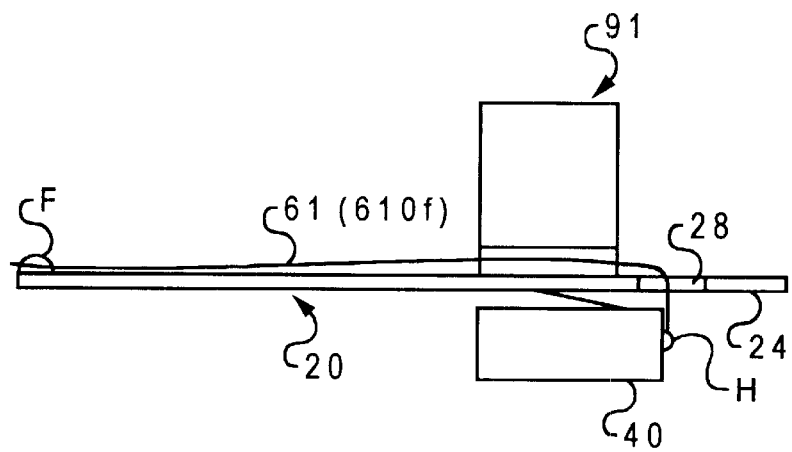
Figure 17:
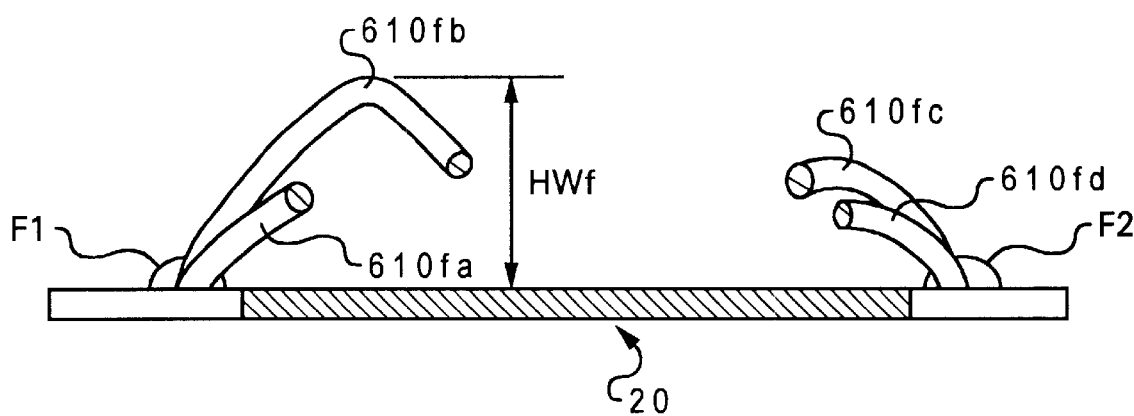
FIG. 17 is a sectional side view of the prior art HGA after wire forming is applied to the wire loops.

The wire forming process of the present invention is described below. FIG. 11 is a perspective view of the structure of a wire forming apparatus of the present invention. FIG. 12 is a side view of the wire forming apparatus. In the apparatus is set the HGA2 in which wire forming is to be done. FIG. 13 illustrates how the wire forming process is performed by the above wire forming apparatus and FIG. 14 illustrates the principle of the wire forming process in this embodiment. In FIGS. 13 and 14, FIG. 13(a) and FIG. 13(d) correspond to FIG. 14(a) and FIG. 13(b) corresponds to FIG. 14(b), as well as FIG. 13(c) corresponds to FIG. 14(c) with respect to the clock time respectively.

As shown in FIGS. 11 and 12, the wire forming apparatus comprises a base 71, guides 72 for an HGA supporting unit 84, a wire forming unit 73, a wire forming unit supporter 74, and a pin unit 75. The two guides 72 and the wire forming unit supporter 74 are fixed on the surface of the base 71. In the area 71a provided on the surface of the base 71 enclosed by the two guides 72 and the side surface 74b of the wire forming unit supporter 74 is set the HGA supporting unit 84.

The HGA2 is mounted on the surface 84a of the HGA supporting unit 84. And, a positioning guide 84b is protruded from the surface 84a of the HGA supporting unit 84. The positioning guide 84b is fit in the aperture (for example, a fixing hole 55 provided at the rear end 23) of the load beam 20 of the HGA2. In addition, at the front end of the surface 84a is formed a notch 84c for housing and supporting the head/slider 40.

The cylinder shaft 74a protruded from the forming unit supporter 74 and the cylinder bearing 73a provided for the wire forming unit 73 are combined to compose a cylinder mechanism. The wire forming unit 73 is disposed so that it can go down to the home position above the wire forming unit supporter 74 by the use of the above cylinder mechanism and a spring mechanism (not illustrated). The wire forming unit 73, when its top surface is pressed, goes down towards the wire forming unit supporter 74. When the top surface is released, the unit 73 goes up to return to the above home position.

On one side of the wire forming unit 73 is provided a pin unit supporter 73b. The pin unit supporter 73b is composed of two side plates and a supporting plate for supporting those two side plates approximately in parallel. The supporting plate is attached to one side of the wire forming unit 73.

The pin unit 75 is formed as an approximate rectangular solid and disposed between both side plates of the pin unit supporter 73b. Close to one of the ends in the lower portion 75a of the pin unit 75 is provided a rotary bearing 75b. A rotary shaft 73c fit in the rotary bearing 75b is provided between both side plates of the pin unit supporter 73b. The rotary shaft 73c and the rotary bearing 75b are combined to compose a rotary mechanism. At the other end at the lower side 75a of the pin unit 75 is provided a wire forming pin 75c for forming the four wire loops 610. A stopper pin 73d is provided so as to protruded from the supporting plate of the pin unit supporter 73b.

The pin unit 75 is disposed at its inclined home position shown in FIG. 12 so as to be rotated by the above rotary mechanism and the spring mechanism 76. The pin unit 75 is rotated in the R2 direction shown in FIG. 12 according to the further move-down of the wire forming unit 73 if the wire forming pin 75c is pressed by the wire loop 610 and the load beam 20 when the pin 75c hits those items 610 and 20 due to the move-down of the wire forming unit 73. The pin unit 75 stops its rotation if the side surface 75c hits the stopper pin 73d. The wire forming unit 73 then goes up from the position where the pin unit 75 has hit the stopper pin 73d. If the wire forming pin 75c is released from the wire loop 610 and the load beam 20, the pin unit 75 rotates in the reverse direction and returns to the inclined home position.

The wire forming unit 73 and the pin unit 75 are combined to compose means for letting the wire forming pin 75c go down onto the surface of the load beam 20, thereby letting the wire forming pin 75c come in contact with a predetermined point of the wire loop 610 so as to compress the predetermined point. After the predetermined point is compressed, the wire forming pin 75c composes means for extruding the above predetermined compressed portion towards the head connecting point edge by rotating the compressed predetermined point towards the head connecting point edge.

The wire forming process of the present invention includes the following steps, which are carried out sequentially:

(1) A step for compressing a predetermined pressing point of each wire loop 610 until the point comes in contact with the load beam 20; and
(2) A step for extruding the compressed pressing portion towards the head connecting point edge H so as to deform a wire section close to the head connecting point edge H plastically.

The step (1) includes the processings between (a) and (b) in FIGS. 13 and 14. The step (2) includes the processings between (b) and (c) in FIGS. 13 and 14. Prior to step (1), the HGA supporting unit 84 is set and positioned in the area 71a on the base surface of the wire forming apparatus. At this time, the HGA 2 (see FIG. 8) is already mounted on the HGA supporting unit 84 and the head/slider 40 and the four wires 61 are already set on the HGA 2. As shown in FIG. 12, therefore, both sides of the HGA supporting unit 84 are in contact with one side of each of the two guides 72 respectively. The front 84d of the HGA supporting unit 84 comes in contact with the side 74b of the wire forming unit supporter 74. In addition, the head supporting surface 22 of the load beam 20 is supported on the HGA supporting unit surface 84a and the head/slider 40 is fit in the notch 84c formed at the front end of the HGA supporting unit 84 and held at the bottom of the notch 84c.

The processing in steps (1) and (2) is described below in detail:
(1) Step for Compressing Wire Loops As shown in FIGS. 13(a) and (b), if the top surface of the wire forming unit 73 is pressed, the wire forming unit 73 and the pin unit 75 go down, thereby the wire forming pin 75c hits the pressing point J of each of the four wire loops 610 and the wire forming pin 75c compresses the point J until the point J comes in contact with the surface of the load beam 20.

More concretely, as shown in FIGS. 14(a) and (b), a wire loop point separated by a distance Dj from the head connecting point edge H is decided as the pressing point J and this point J is compressed until the point J hits the load beam 20. At this time, the wire fixing point E is set closer to the head connecting point edge H than that of the conventional HGA, thereby making the distance De between the head connecting point Hg and the wire fixing point Eg shorter than that of the conventional HGA. It is thus possible to reduce the looseness of the wire between the pressing point J and the wire fixing point E more than that of the conventional HGA. And, if a point on the g-axis, which is corresponding to the pressing point J, is defined as Jg, then the distance Dj between the head connecting point Hg and the wire fixing point Jg becomes 0.6 to 0.8 mm in this embodiment. In FIG. 13, it is not a point, but it is a section of the wire loop 610 that is compressed. In such a case, the end of a section to compress at the head connecting point edge H side is decided as the pressing point J.
(2) Plastic Deforming Step for Wire Loops As shown in FIGS. 13(b) and (c), after the pressing point J of the wire loop 610 is pressed against the load beam 20 by the wire forming pin 75c, if the wire forming unit 73 is further moved down, then the pin unit 75 is rotated in the R2 direction around the rotary shaft 73c. Consequently, the wire forming pin 75c moves on the load beam 20 towards the head connecting point edge H while pressing down the pressing point J of the wire loop 610, thereby extruding the pressing point J of the wire loop 610 towards the head connecting point edge H. The pin unit 75, which is rotated while the wire forming pin 75c extrudes the pressing point J, stops the rotation when it hits the stopper pin 73d. The wire forming unit 73 is thus released and goes up to return to the home position. As the wire forming unit 73 goes up such way, the pin unit 75 is rotated in the opposite direction of the R2 to return to the inclined home position. The wire forming pin 75c is thus released from the pressing point J of the wire loop 610.

More concretely, as shown in FIGS. 14(b) and (c), the pressing point J pressed against the load beam 20 at a point separated by a distance Dj from the head connecting point edge H is extruded only by a distance $\Delta Dj$ towards the head connecting point edge H. At this time, because the pressing point J is pressed from above and extruded, the wire can be prevented from getting away to the rear side of the wire forming pin 75c. Consequently, a large stress can be applied to the wire loop section K between the pressing point J and the head connecting point edge H, thereby the wire loop section K can be deformed plastically and bent locally. It is therefore possible to reduce the wire height HWe of the wire loop 610 (see FIG. 5(b)). In addition, because the shapes of the four wire loops 610 can be unified in the section K, those wire loops 610 can apply the same bias pressure on the head/slider 40, thereby the static attitude of the head/slider 40 can be stabilized.

An experiment carried out for the HGA of the present invention found that the distance De between the head connecting point Hg and the wire fixing point Eg was set to 3.8 mm or under and furthermore, the above distance De was set to 2.7 mm or over. FIG. 15 explains the experiment. Three types of HGA's (HGAa, HGAb, and HGAc) were prepared and a plurality of HGA's were prepared for each type HGA. In each of those HGA's the wires 61 were fixed at different points Ea, Eb, and Ec. Then, the wire forming shown in FIG. 13 was applied for each of the HGAa, HGAb, and HGAc. In the same way, a plurality of conventional HGA's were prepared. In the conventional HGA, each wire 61 was fixed at the conventional wire fixing point F. The wire forming shown in FIG. 13 was also applied to each of these conventional HGA's. Then, the wire height and the static attitude of the head/slider 40 were compared among HGAa, HGAb, HGAc, and the conventional HGA.

In FIG. 15, Ega, Egb, and Egc are wire fixing points on the g-axis (an axis in parallel to the center axis of the load beam 20), which are corresponding to the wire fixing points Ea, Eb, and Ec, Da, Db, and Dc are distances between the head connecting point Hg and each of the wire fixing points Ega, Egb, and Egc. LWa, LWb, and LWc are wire lengths between the head connecting point Hg and each of the wire fixing points Ega, Egb, and Egc. In the above experiment, it was assumed that Da=4.25 mm, Db=3.25 mm, Dc=2.25 mm, ΔLW=0.31 mm, LWa=4.56 mm, LWb=3.56 mm, LWc=2.56 mm, Dn=19.50 mm.

In each of HGAa, HGAb, and HGAc, plastic deformation was achieved in each wire loop close to the head connecting point edge H more satisfactorily than in the conventional HGA and the wire height was lower (concretely, the variation among wire heights was small) than that of the conventional HGA. In addition, in each of HGAa, HGAb, and HGAc, the variation of plastic deformation among the four wire loops was smaller around the head connecting point edge H than that of the conventional HGA and the static attitude of the head/slider 40 was more stable (the variation of static attitude among the HGA's was smaller) than that of the conventional HGA.

Among HGAa, HGAb, and HGAC, the HGAb was the best for reducing the wire height and stabilizing the static attitude of the head/slider. Consequently, in the HGA2 in this embodiment, the values of the HGAb were employed for the distance De between the head connecting point Hg and the wire fixing point Eg, as well as the wire length LWe, so that De=Db=3.25 mm and LWe=LWa=3.56 mm were set.

The wire height was reduced more in order of HGAa, HGAb, and HGAc. The wire height was reduced more as the distance between the head connecting point and the wire fixing point (that is, the wire length) was set shorter. This effect was remarkable in both HGAa and HGAb. This is why the distance De between the head connecting point Hg and the wire fixing point Eg should preferably be 3.8 mm or under to reduce the wire height. This 3.8 mm means an intermediate value between the distance Da in the HGAa and the distance Db in the HGAb.

Furthermore, HGAb could stabilize the static attitude of the head/slider 40. Consequently, it was found that the distance De between the head connecting point Hg and the wire fixing point Eg should preferably be 2.7 to 3.8 mm to stabilize the static attitude of the head/slider 40. This 2.7 mm means an intermediate value between distances Db and Dc.

According to this embodiment of the present invention, therefore, the distance De between the head connecting point Hg and the wire fixing point Eg in the HGA2 is set to 3.25 mm, which is shorter than that in the conventional HGA. In addition, the four wire loops 610 in the HGA2 are deformed plastically in two steps; a step for compressing each of the four wire loops 610 at the pressing point J on the surface of the load beam 20 and a step for extruding this pressing point J towards the head connecting point edge H. Consequently, it is possible to deform a section of each wire loop 610 close to the head connecting point edge plastically enough, thereby the wire height HWe can be set lower than that in the conventional HGA and the static attitude of the head/slider 40 can be stabilized more satisfactorily than in the conventional HGA. As a result, the disk apparatus can further be reduced in thickness.

As described above, according to the HGA of the present invention, because the distance between the head connecting point and the wire fixing point is set to 3.8 mm or under, the wire height can be reduced through wire forming easily and surely.

Furthermore, according to the wire forming method and apparatus of the present invention, because a predetermined point of each wire loop is compressed from above and this compressed portion is protruded towards the head connecting point edge, a section of the wire loop close to the head connecting point edge can always be deformed plastically. It is thus possible to reduce the wire height and stabilize the static attitude of the head/slider effectively.

While the invention has been particularly shown and described with reference to a preferred embodiment, it will be understood by those skilled in the art that various changes in form and detail may be made therein without departing from the spirit and scope of the invention.

What is claimed is:

1. A head gimbal assembly used for a disk apparatus having a disk, comprising:
a plurality of heads/sliders each consisting of a slider that flies above a surface of said disk and a head for reading/writing data from/onto the surface of said disk in a non-contact manner;
a plurality of conductive wires, each being connected to one of said heads for transmitting data;
a load beam provided with said wires thereon and used for holding said heads/sliders close to a front end and supported by an actuator at a rear end; wherein
each of said wires are fixed at a fixing point between said head connecting point edge and said rear end on a surface of said load beam to form a wire loop between said head connecting point end and said wire fixing point, and
said distance between head connecting point and said wire fixing point is about 2.7 to 3.8 mm; and wherein said wire loop is formed by:
compressing a predetermined portion of said wire loop from above on the surface of said load beam; and
extruding said compressed predetermined portion toward said head connecting point edge, thereby a section between said head connecting point edge and said predetermined portion is deformed plastically.

2. The head gimbal assembly according to claim 1, wherein:

said head/slider is held at a first surface of said load beam;

an aperture is formed close to the front end of said load beam; and each of said wires extending from said head connection point edge is passed through said aperture and fixed on a second surface of said load beam.

3. The head gimbal assembly according to claim 1, wherein a plurality of said wires extended from said head connecting point edge are separated into two groups; and wires in said two groups are fixed at first and second fixing points respectively, so that the distance between said head connecting point of each of said first and second fixing points becomes equal.

4. A wire forming apparatus for forming a wire loop, comprising:

a head gimbal assembly used for a disk apparatus having a disk, comprising:

a plurality of heads/sliders each consisting of a slider that flies above a surface of said disk and a head for reading/writing data from/onto the surface of said disk in a non-contact manner;

a plurality of conductive wires, each being connected to one of said heads for transmitting data;

a load beam provided with said wires thereon and used for holding said heads/sliders close to a front end and supported by an actuator at a rear end; wherein each of said wires are fixed at a fixing point between said head connecting point edge and said rear end on a surface of said load beam to form a wire loop between said head connecting point end and said wire fixing point;

said distance between head connecting point and said wire fixing point is about 2.7 to 3.8 mm; and further comprising:

a wire forming pin;

a device for compressing said predetermined portion by moving said wire forming pin down onto the surface of said load beam, thereby letting said wire forming pin come in contact with said predetermined portion of said wire loop; and a device for extruding said predetermined portion toward said head connecting point edge by rotating said wire forming pin, which has compressed said predetermined portion toward a head connecting point edge.

* * * * *

UNITED STATES PATENT AND TRADEMARK OFFICE
CERTIFICATE OF CORRECTION

PATENT NO.   : 6,493,189 B1
DATED        : December 10, 2002
INVENTOR(S)  : Itoh et al.

It is certified that error appears in the above-identified patent and that said Letters Patent is hereby corrected as shown below:

Column 8,
Line 37, please replace "damper 53." with -- clamper 53 --.

Signed and Sealed this

Eighth Day of July, 2003

JAMES E. ROGAN
*Director of the United States Patent and Trademark Office*